(12) United States Patent
Reese et al.

(10) Patent No.: US 8,188,704 B2
(45) Date of Patent: May 29, 2012

(54) METHODS, SYSTEMS AND PRODUCTS FOR MANAGING ENERGY CONSUMPTION

(75) Inventors: Kevin Reese, Fayetteville, GA (US); Alfonso Jones, Suwanee, GA (US); Steven McDonald, Locust Grove, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 448 days.

(21) Appl. No.: 12/430,916

(22) Filed: Apr. 28, 2009

(65) Prior Publication Data

US 2010/0270968 A1    Oct. 28, 2010

(51) Int. Cl.
*H02J 7/00* (2006.01)
*H02J 7/14* (2006.01)

(52) U.S. Cl. .................. 320/104; 320/103; 320/105

(58) Field of Classification Search .......... 320/103–105; 307/10.1
See application file for complete search history.

(56) References Cited

U.S. PATENT DOCUMENTS

| | | | |
|---|---|---|---|
| 4,902,956 A | 2/1990 | Sloan | |
| 5,200,688 A * | 4/1993 | Patino et al. ............ | 320/104 |
| 5,200,877 A | 4/1993 | Betton | |
| 5,929,604 A | 7/1999 | Irvin | |
| 6,009,363 A | 12/1999 | Beckert | |
| 6,442,702 B1 | 8/2002 | Ishikawa | |
| 6,646,845 B1 | 11/2003 | Turner | |
| 6,747,371 B2 | 6/2004 | Kotlow | |
| 6,778,078 B1 | 8/2004 | Han et al. | |
| 7,107,472 B2 | 9/2006 | Weinold | |
| 7,116,078 B2 | 10/2006 | Colombo | |
| 7,129,598 B2 | 10/2006 | Wagner | |
| 7,166,990 B2 | 1/2007 | Lo | |
| 7,211,907 B2 | 5/2007 | Kephart | |
| 7,212,892 B2 | 5/2007 | Matsui | |
| 7,248,152 B2 | 7/2007 | Gilbert | |
| 2005/0029867 A1 | 2/2005 | Wood | |
| 2005/0285445 A1 * | 12/2005 | Wruck et al. ............ | 307/10.1 |
| 2006/0214508 A1 | 9/2006 | Binder | |
| 2007/0069913 A1 * | 3/2007 | Hatten et al. ............ | 340/691.1 |

* cited by examiner

*Primary Examiner* — Samuel Berhanu
(74) *Attorney, Agent, or Firm* — Scott P. Zimmerman, PLLC

(57) ABSTRACT

Methods, systems, and products are disclosed for managing energy consumption. Electrical power from an auxiliary battery system is received. The electrical power is shared with peripheral devices. A characteristic of a vehicle battery is received from an interface to an on board diagnostic system. When the electrical power received from the auxiliary battery system is less than a threshold value, then the auxiliary battery system is charged from a connection to the vehicle battery. The charging of the auxiliary battery system is disabled when the characteristic of the vehicle battery is less than the minimum value.

20 Claims, 17 Drawing Sheets

METHODS, SYSTEMS AND PRODUCTS FOR MANAGING ENERGY CONSUMPTION

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to electrical systems and to batteries and, more particularly, to automobile battery protection and to vehicle battery charging.

A dead car battery is common. Schemes are known that help avoid a dead battery. These known schemes, though, do not account for the proliferation of after-market accessory devices that are commonly installed in today's vehicles.

SUMMARY

The exemplary embodiments provide methods, systems, and products for managing energy consumption. Electrical power from an auxiliary battery system is received. The electrical power is shared with peripheral devices. A characteristic of a vehicle battery is received from an interface to an on board diagnostic system. When the electrical power received from the auxiliary battery system is less than a threshold value, then the auxiliary battery system is charged from a connection to the vehicle battery. The charging of the auxiliary battery system is disabled when the characteristic of the vehicle battery is less than the minimum value.

More exemplary embodiments include a system for managing energy consumption. An interface is established with a vehicle's on-board diagnostic system. Electrical power is received from a battery in a laptop computer. A peripheral device interfaces with the laptop computer and shares the electrical power received from the battery in the laptop computer. A characteristic of a vehicle battery is received from the on board diagnostic system and compared to a minimum value. The electrical power from the battery in the laptop computer is also compared to a threshold value. The battery in the laptop computer is charged from a connection to the vehicle battery when the electrical power received from the battery in the laptop computer is less than the threshold value. The charging of the battery in the laptop computer is disabled when the characteristic of the vehicle battery is less than the minimum value.

Other exemplary embodiments describe a computer readable medium. An interface is established with a vehicle's on-board diagnostic system. Electrical power is received from a battery in a laptop computer. A peripheral device interfaces with the laptop computer and shares the electrical power received from the battery in the laptop computer. A characteristic of a vehicle battery is received from the on board diagnostic system and compared to a minimum value. The electrical power from the battery in the laptop computer is also compared to a threshold value. The battery in the laptop computer is charged from a connection to the vehicle battery when the electrical power received from the battery in the laptop computer is less than the threshold value. The charging of the battery in the laptop computer is disabled when the characteristic of the vehicle battery is less than the minimum value.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
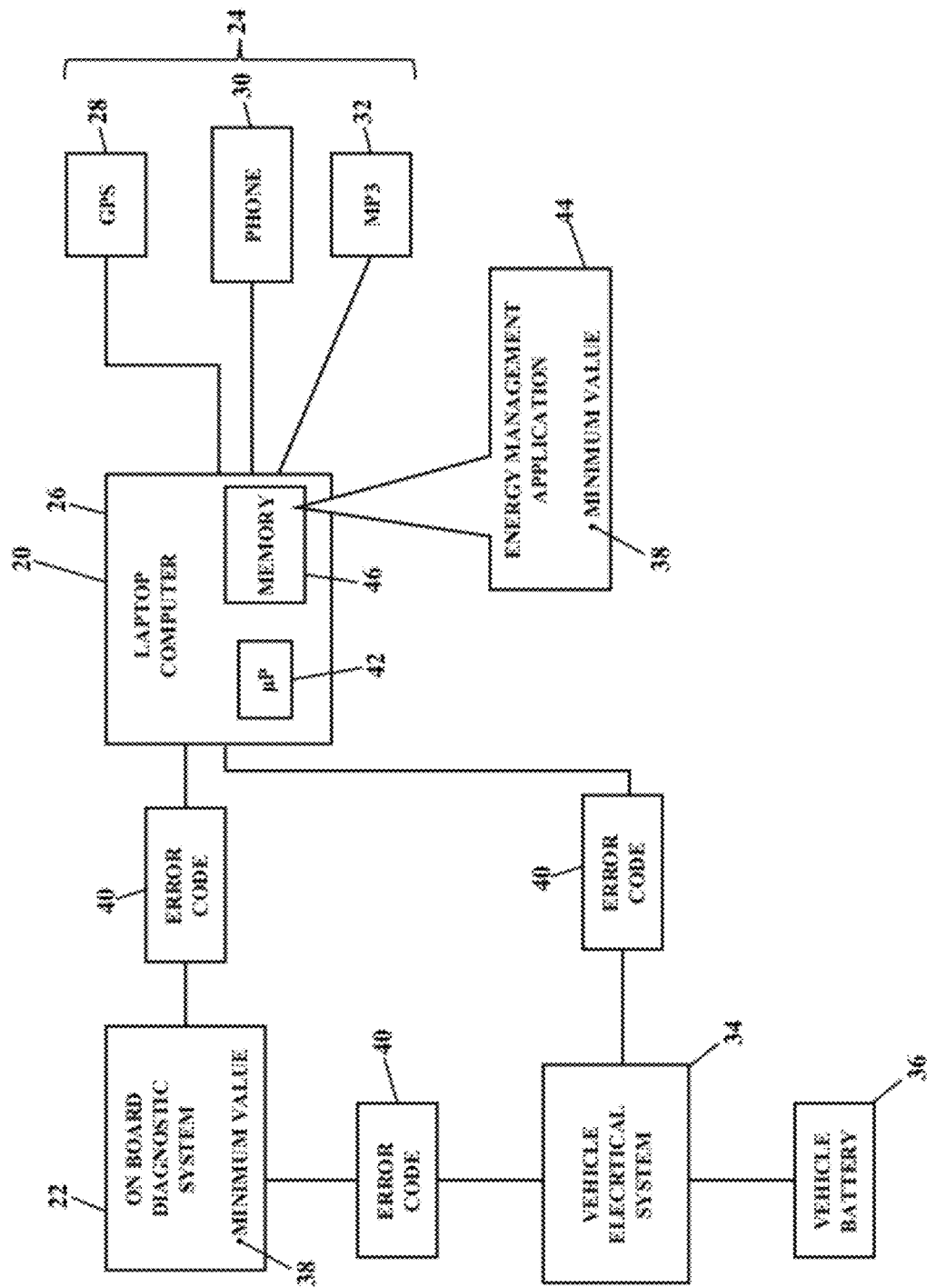
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a processor-controlled device 20 that interfaces with a vehicle's on board diagnostic system 22 and with one or more peripheral devices 24. The processor-controlled device 20 is illustrated as a laptop computer 26, but the processor-controlled device 20 may be any device, as later paragraphs will explain. The peripheral devices 24 are illustrated as a Global positioning system 28, a wireless phone 30, and an .mp3 player 32, but the peripheral devices 24 may include any device that is capable of interfacing with the processor-controlled device 20. The laptop computer 26 may interface with a vehicle's electrical system 34 to receive electrical power from a vehicle battery 36. As most readers understand, the laptop computer 26 and the after-market peripherals 24 may consume electrical power from the vehicle battery 36. If the electrical energy or available power from vehicle battery 36 is not properly managed, the laptop computer 26 and/or the after-market peripherals 24 may drain most, or all, of the available energy or power from the vehicle battery 36. The vehicle battery 36 may then be "dead," thus preventing a driver from starting the vehicle.

Exemplary embodiments, though, manage energy consumption. Exemplary embodiments monitor the condition of the vehicle battery 36 and reserve or set-aside a minimum value 38 of electrical power that is available from the vehicle battery 36. When the electrical power available from the vehicle battery 36 is less than or equal to the minimum value 38 of electrical power, then the vehicle's on board diagnostic system 22 detects or flags an error code 40. The error code 40 is communicated to the laptop computer 26. The laptop computer 26 has a processor 42 (e.g., "µP"), application specific integrated circuit (ASIC), or other component that executes an energy management application 44 stored in a memory 46. The energy management application 44 receives the error code 40 describing the minimum value 38 of electrical power available from the vehicle battery 36. The energy management application 44 then causes the processor 42 to shut down or disable the laptop computer 26 and/or the after-market peripherals 24. The energy management application 44 thus reserves the minimum value 38 of electrical power in the vehicle battery 36 to ensure sufficient energy remains to start an engine, to power an electric motor, or to provide power to any device or system.

The on board diagnostic system 22 comprises an expanded set of standards and practices developed by the Society of Automotive Engineers and adopted by the Environmental Protection Agency and by the California Air Resources Board. The on board diagnostic system 22 is known to those of ordinary skill in the art, so the known details will not be further discussed. Here, though, the error code 40 is established to indicate a configurable condition, parameter, or characteristic of the vehicle battery 36. When the electrical power available from the vehicle battery 36 is less than or equal to the minimum value 38 of electrical power, then the on board diagnostic system 22 sets the error code 40. The error code 40 indicates that the electrical power available from the vehicle battery 36 is less than or equal to the minimum value 38 of electrical power (e.g., $P_{Batt} \leq P_{Min}$). The error code 40 is communicated to the processor-controlled device 20 to begin energy conservation measures.

Some aspects of battery management are known, so this disclosure will not greatly explain the known details. If the reader desires more details, the reader is invited to consult the following sources, with each incorporated herein by reference in its entirety: U.S. Patent Application Publication 2006/0214508 to Binder; U.S. Patent Application Publication 2005/0285445 to Wruck, et al; U.S. Patent Application Publication 20050029867 Wood; U.S. Pat. No. 7,248,152 to Gilbert, et al; U.S. Pat. No. 7,212,892 to Matsui, et al; U.S. Pat. No. 7,211,907 to Kephart; U.S. Pat. No. 7,166,990 to Lo; U.S. Pat. No. 7,129,598 to Wagner, et al.; U.S. Pat. No. 7,116,078 to Colombo, et al.; U.S. Pat. No. 7,107,472 to Weinold; U.S. Pat. No. 6,778,078 to Han, et al.; U.S. Pat. No. 6,747,371 to Kotlow, et al; U.S. Pat. No. 6,646,845 to Turner, et al; U.S. Pat. No. 6,442,702 to Ishikawa, et al; U.S. Pat. No. 6,009,363 to Beckert, et al.; U.S. Pat. No. 5,929,604 to Irvin; U.S. Pat. No. 5,200,877 to Betton, et al.; and U.S. Pat. No. 4,902,956 to Sloan.

The processor-controlled device 20 is only simply illustrated. Because the architecture and operating principles of processor-controlled devices are well known, their hardware and software components are not further shown and described. If the reader desires more details, the reader is invited to consult the following sources: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($8^{th}$ Ed., 2009); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Figure 2:
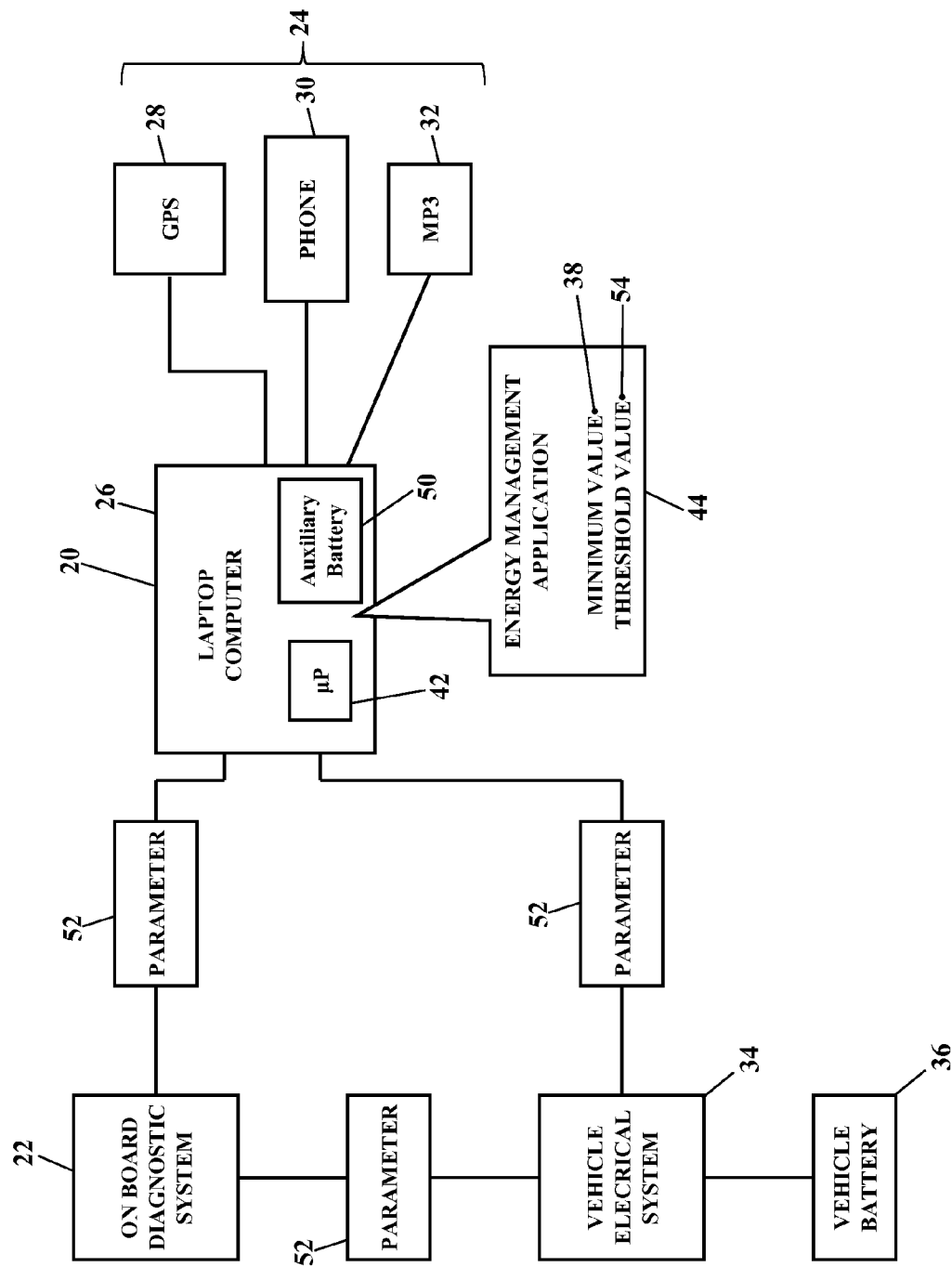
FIG. 2 is a schematic further illustrating the energy management application 44, according to exemplary embodiments.

FIG. 2 is a schematic further illustrating the energy management application 44, according to exemplary embodiments. Here the processor-controlled device 20 is again illustrated as the laptop computer 26, and the laptop computer 26 may include its own auxiliary battery 50 (such as an internal laptop battery). The energy management application 44 interfaces with the vehicle's on board diagnostic system 22 and with the one or more peripheral devices 24. The auxiliary battery 50 may consume electrical power from the vehicle battery 36, and the auxiliary battery 50 may also at least partially provide electrical power to the after-market peripherals 24. Here, then, the energy management application 44 may manage the energy consumed from both the vehicle battery 36 and from the auxiliary battery 50. Exemplary embodiments thus conserve the energy available from the vehicle battery 36 to ensure the minimum value 38 of electrical power remains available.

The energy management application 44 may monitor the vehicle battery 36. The energy management application 44 receives a parameter 52 that describes a characteristic of the vehicle battery 36. The parameter 52 may be generated by and received from the on board diagnostic system 22 and/or by/from the vehicle's electrical system 34. The parameter 52 describes a voltage associated with the vehicle battery 36 and/or a current drawn from the vehicle battery 36. The parameter 52 may additionally or alternatively describe electrical power or energy consumed by or available from the vehicle battery 36.

The energy management application 44 may also charge the auxiliary battery 50. Because the one or more peripheral devices 24 at least partially receive energy from the auxiliary battery 50, the electrical power received from the auxiliary battery 50 is shared amongst the peripheral devices 24. The energy management application 44 compares the electrical power available from the auxiliary battery 50 to a threshold value 54. When the electrical power available from the auxiliary battery 50 is less than the threshold value 54 (e.g., $P_{Batt} \leq P_{Threshold}$), then the energy management application 44 may charge the auxiliary battery 50 from the vehicle battery 36. That is, the energy management application 44 instructs the processor 42 to establish a logical or physical connection with the vehicle battery 36. When the electrical power available from the vehicle battery 36 exceeds the electrical power available from the auxiliary battery 50, then the auxiliary battery 50 may be charged by the vehicle battery 36.

The energy management application 44 may also disable charging of the auxiliary battery 50. If the vehicle battery 36 is depleted of sufficient electrical power, then the vehicle battery 36 may not be able to start the vehicle or perform other mandatory or essential functions. The energy management application 44, then, may not charge the auxiliary battery 50 to the detriment of the vehicle battery 36. The energy management application 44 may thus continue comparing the energy or power available from the vehicle battery 36 to the minimum value 38 of electrical power. When the energy available from the vehicle battery 36 is less than or equal to the minimum value 38 (e.g., $P_{Batt} \leq P_{Min}$), then the energy management application 44 may disable charging of the auxiliary battery 50. Exemplary embodiments thus continue to reserve or set-aside sufficient electrical power or energy to ensure minimalist functions are met (such as starting an internal combustion engine).

Safety factors may be implemented. The user/driver of a vehicle may want to begin conservation measures before the energy available from the vehicle battery 36 is equal to the minimum value 38 (e.g., $P_{Batt} \leq P_{Min}$). The energy management application 44, for example, may be configured to begin conservation when some other power, voltage, or energy level is reached. The driver, for example, may want to conservatively begin conservation measures when the power available from the vehicle battery 36 is twenty percent (20%) above the minimum value 38 (e.g., $P_{Batt} = (1.2)P_{Min}$). The energy management application 44 may thus be configured with alternate, minimum values at which conservation begins.

Figure 3:
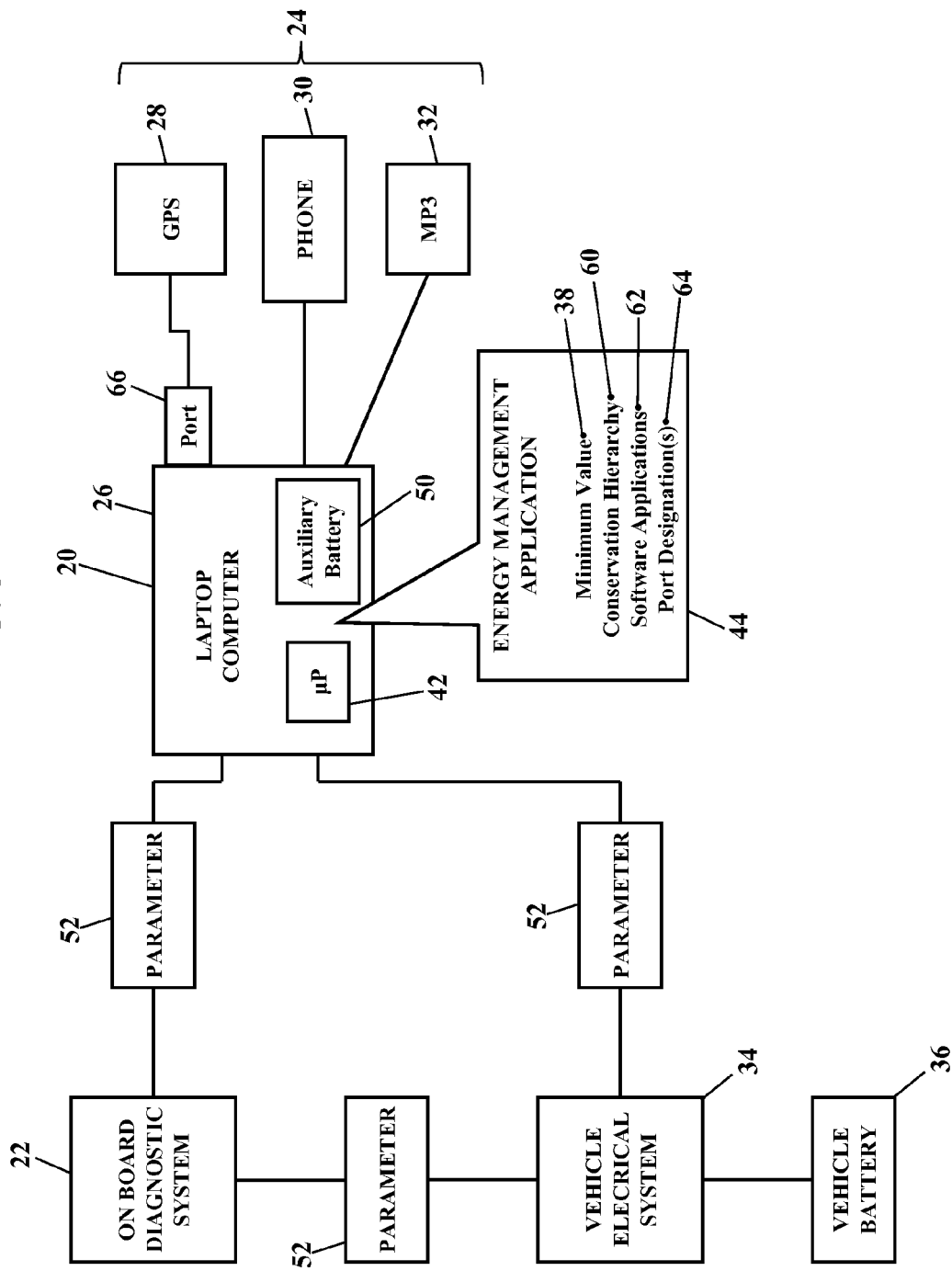
FIG. 3 is a schematic illustrating a conservation hierarchy, according to exemplary embodiments.

FIG. 3 is a schematic illustrating a conservation hierarchy, according to exemplary embodiments. Here the energy management application 44 may invoke one or more schemes to selectively conserve the electrical power available from the auxiliary battery 50 and/or the vehicle battery 36. Because the one or more peripheral devices 24 at least partially receive energy from the auxiliary battery 50, the peripheral devices 24 share electrical power received from the auxiliary battery 50. When the energy management application 44 must conserve electrical energy, the energy management application 44 may disable the sharing of the electrical power from the auxiliary battery 50. The energy management application 44 may retrieve a conservation hierarchy 60. The conservation hierarchy 60 may be a user-defined, configurable setting(s), parameter(s), or instruction(s) that define/defines a hierarchy for disabling the peripheral devices 24. Each individual peripheral device 24 may be assigned a position in the conservation hierarchy 60. A lowest-priority peripheral device, for example, is the first to be denied electrical power from the auxiliary battery 50 and/or the vehicle battery 36. As electrical power is continually consumed, the energy management application 44 may continually compare the energy available from the vehicle battery 36 to the minimum value 38 (e.g., $P_{Batt} \leq P_{Min}$) and sequentially or serially sever the peripheral devices 24 from the auxiliary battery 50 and/or the vehicle battery 36, according to each peripheral device's position in the conservation hierarchy 60. The highest priority peripheral device may be the last to be disabled or disconnected from the auxiliary internal laptop battery 50 and/or the vehicle battery 36. The energy management application 44 may implement a timer before disabling any peripheral device 24, thus allowing each peripheral device 24 to complete a shutdown procedure.

The conservation hierarchy 60 may include software applications 62. When the energy management application 44 must conserve electrical energy, the energy management application 44 may disable individual software applications 62 that run or execute on a particular peripheral device 24 and/or on the processor-controlled device 20. The conservation hierarchy 60, for example, may specify that a non-essential application that consumes a disproportionate or large amount of energy (such as a video-intensive movie or game) may be disabled or shut down. The conservation hierarchy 60 may specify that a voice application or peripheral device (such as a voice over Internet Protocol application or cell phone peripheral device) may have priority over movies and games. If an emergency should happen, the user may want to reserve electrical power for emergency calls. The conservation hierarchy 60, then, may disable individual software applications that run or execute on a particular peripheral device 24.

The conservation hierarchy 60 may include port designations 64. When the energy management application 44 must conserve electrical energy, the energy management application 44 may disable individual communication ports 64 in the laptop computer 26. As the reader may understand, the processor-controlled device 20 may include one or more ports 66 that physically connect to the peripheral devices 24. A serial port, for example, may interface with a display device, and a Uniform Serial Bus may interface with the Global positioning system 28. The conservation hierarchy 60 may specify which of any input and output ports 66 have priority and which that are disabled or shut down to conserve electrical power.

Figure 4:
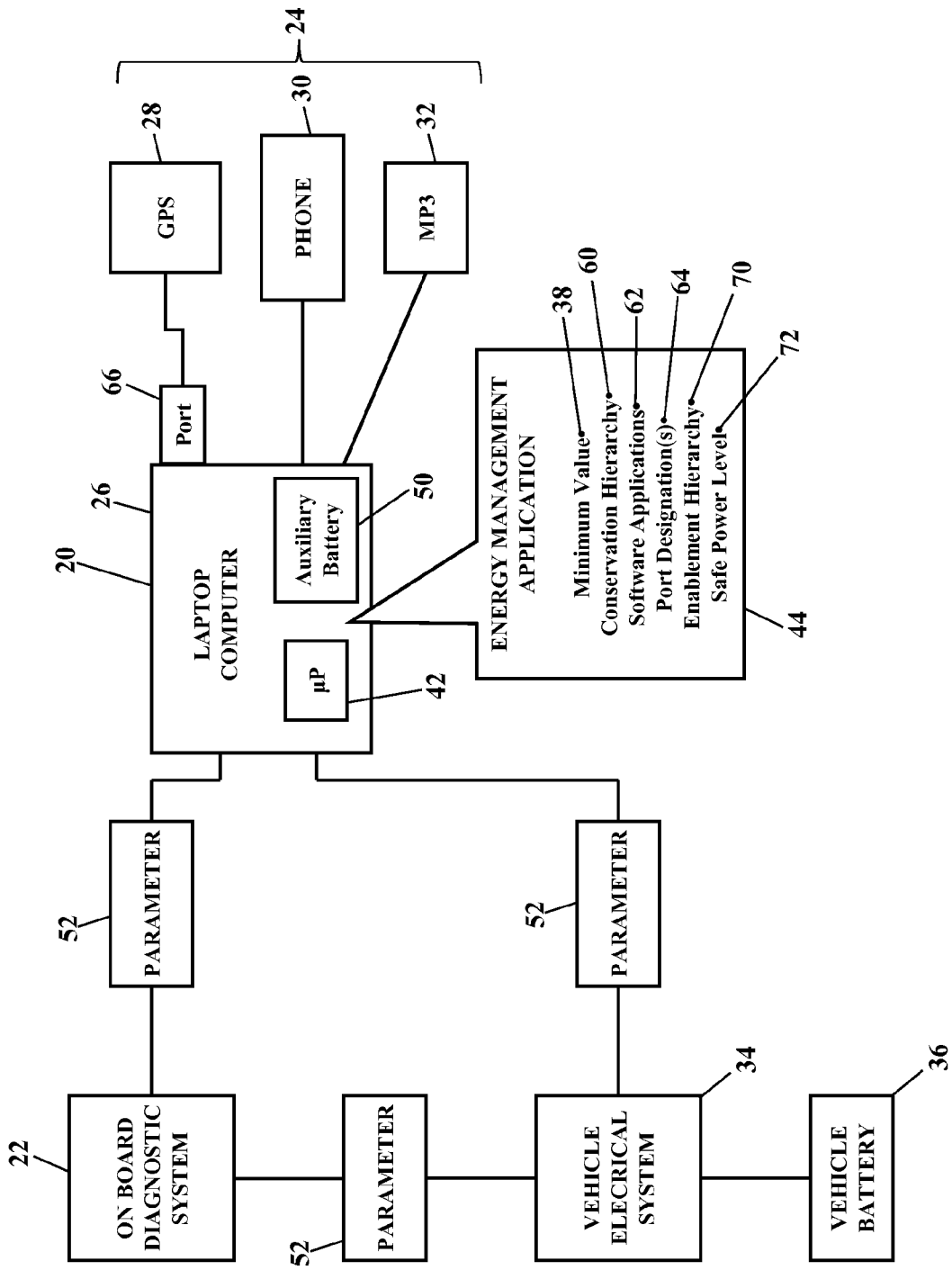
FIG. 4 is a schematic illustrating an enablement hierarchy, according to exemplary embodiments.

FIG. 4 is a schematic illustrating an enablement hierarchy 70, according to exemplary embodiments. Here the energy management application 44 may enable the peripheral devices 24, the software applications 62, and/or the ports 64 according to the enablement hierarchy 70. Because the energy management application 44 may disable according to the conservation hierarchy 60 (as FIGS. 2 and 3 illustrated), the energy management application 44 may then enable, power "on," or boot components when either the auxiliary battery 50 and/or the vehicle battery 36 attains a sufficient power level. The energy management application 44, for example, may compare the energy/power available from the vehicle battery 36 to a safe power level 72. When the energy/power available from the vehicle battery 36 is equal to greater than the safe power level 72, then the energy management application 44 may begin enabling any of the peripheral devices 24, the software applications 62, and/or the ports 64 according to the enablement hierarchy 70. Exemplary embodiments thus permit energy consumption from the vehicle battery 36 according to the configurable safe power level 72.

Figure 5:
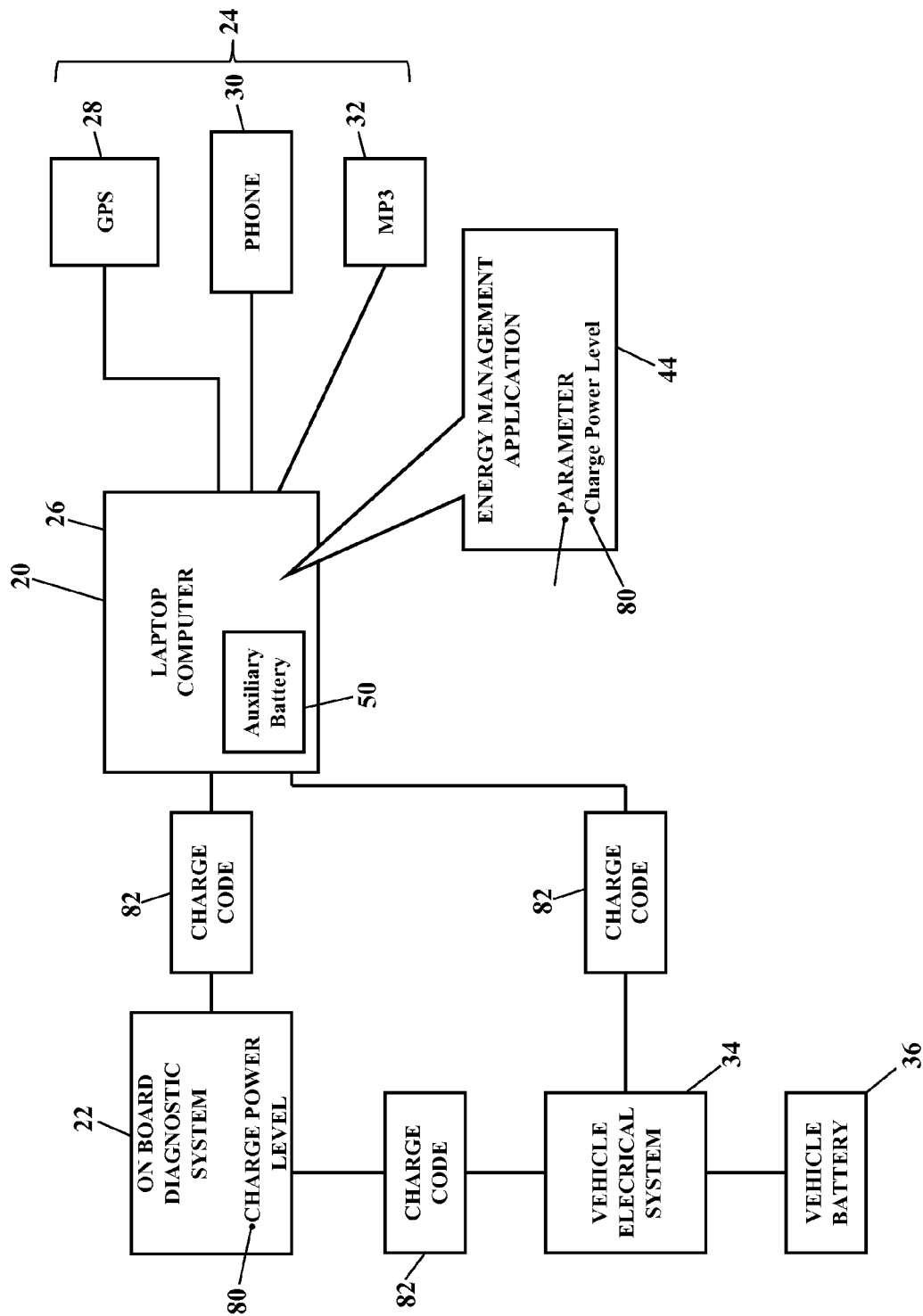
FIG. 5 is a schematic illustrating a charge power level, according to exemplary embodiments.

FIG. 5 is a schematic illustrating a charge power level 80, according to exemplary embodiments. Here the energy management application 44 may begin charging the auxiliary battery 50 when the vehicle battery 36 has attained the charge power level 80. The charge power level 80 represents a configurable electrical energy or power level at which the auxiliary battery 50 may be charged from the vehicle battery 36. The energy management application 44 may compare the energy available from the vehicle battery 36 to the charge power level 80. When the energy available from the vehicle battery 36 (such as described by the parameter 52 explained with reference to FIG. 1) is equal to greater than the charge power level 80 (e.g., $P_{Batt} \geq P_{Charge}$), then the energy management application 44 may begin charging the auxiliary battery 50. Exemplary embodiments may additionally or alternatively receive a begin charging code 82 from the on board diagnostic system 22. The begin charging code 82 indicates that the vehicle battery 36 has attained the charge power level 80, so the energy management application 44 may begin charging the auxiliary battery 50.

Figure 6:
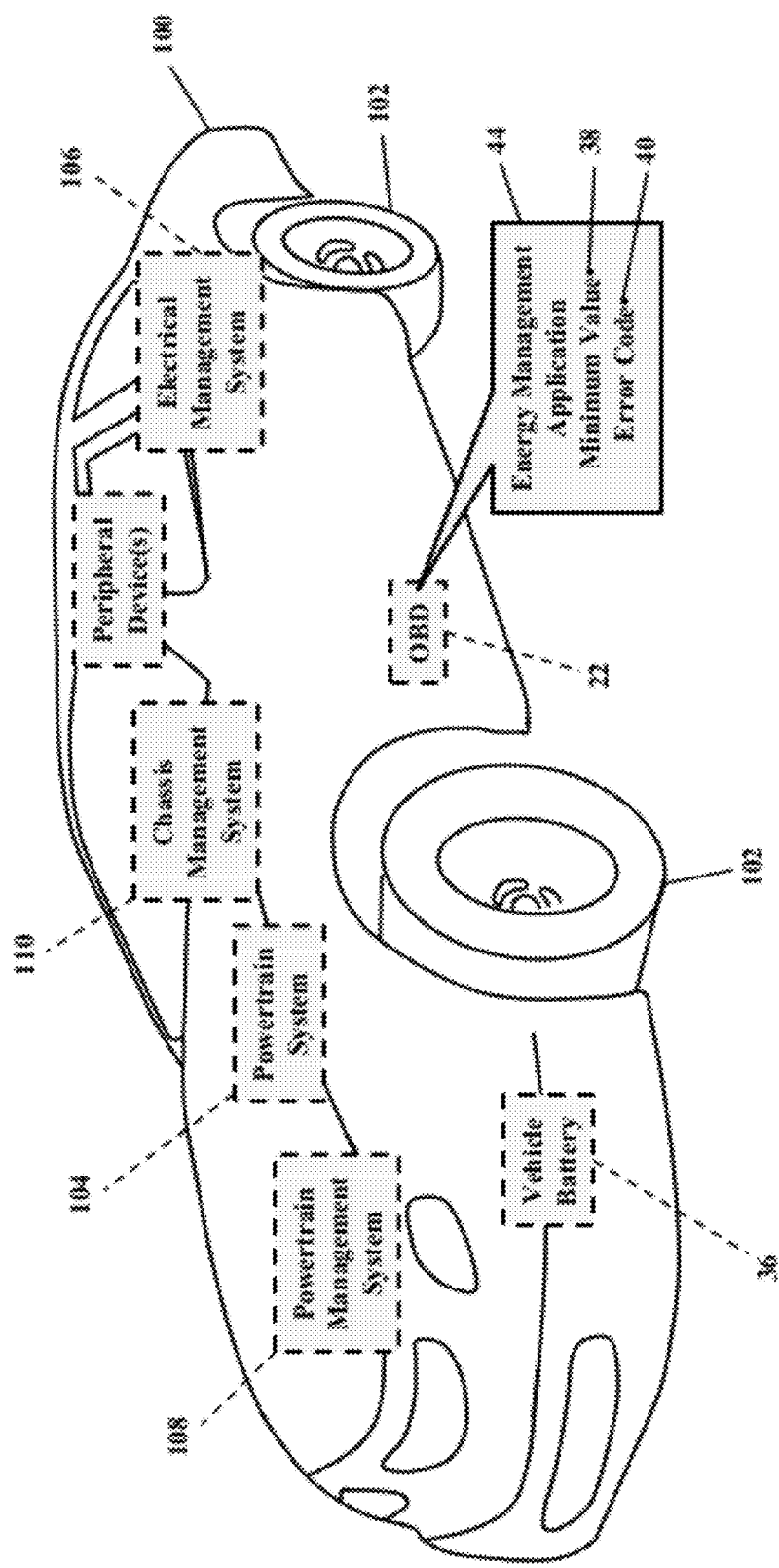
FIG. 6 is a schematic illustrating the energy management application operating in a vehicle, according to exemplary embodiments.

FIG. 6 is a schematic illustrating the energy management application 44 operating in a vehicle 100, according to exemplary embodiments. The vehicle 100 includes at least one wheel and tire assembly 102, and at least one powertrain system 104 drives the at least one wheel and tire assembly 102. The vehicle 100 may include an electrical management system 106, a powertrain management system 108, and/or a chassis management system 110. The on board diagnostic system ("OBD") 22 interfaces with the powertrain system 104, the electrical management system 106, the powertrain management system 108, and/or the chassis management system 110. The vehicle battery 36 provides energy (e.g., voltage and current) to the electrical management system 106, to the powertrain management system 108, and/or to the chassis management system 110. Because these components of the vehicle 100 are known, no detailed discussion is necessary.

Here the energy management application 44 again interfaces with the on board diagnostic system 22. The energy management application 44 is stored in a memory component of the vehicle 100. The energy management application 44, for example, may be a software module or component of the on board diagnostic system 22, such that an OBD processor (not shown for simplicity) associated with the on board diagnostic system 22 executes the energy management application 44. The energy management application 44 may additionally or alternatively be executed by a controller associated with any of the electrical management system 106, the powertrain management system 108, and/or the chassis management system 110.

Exemplary embodiments monitor the condition of the vehicle battery 36. When the electrical power available from the vehicle battery 36 is less than or equal to the minimum value 38 of electrical power, then the vehicle's on board diagnostic system 22 detects or flags the error code 40. The error code 40 is communicated to the energy management application 44. The energy management application 44 receives the error code 40 describing the minimum value 38 of electrical power available from the vehicle battery 36. The energy management application 44 then begins disabling portions or components of the electrical management system 106, the powertrain management system 108, and/or the chassis management system 110. The energy management application 44 thus reserves the minimum value 38 of electrical power to ensure sufficient electrical power remains to start an engine, to power an electric motor, or to provide power to any device or system.

Figure 7:
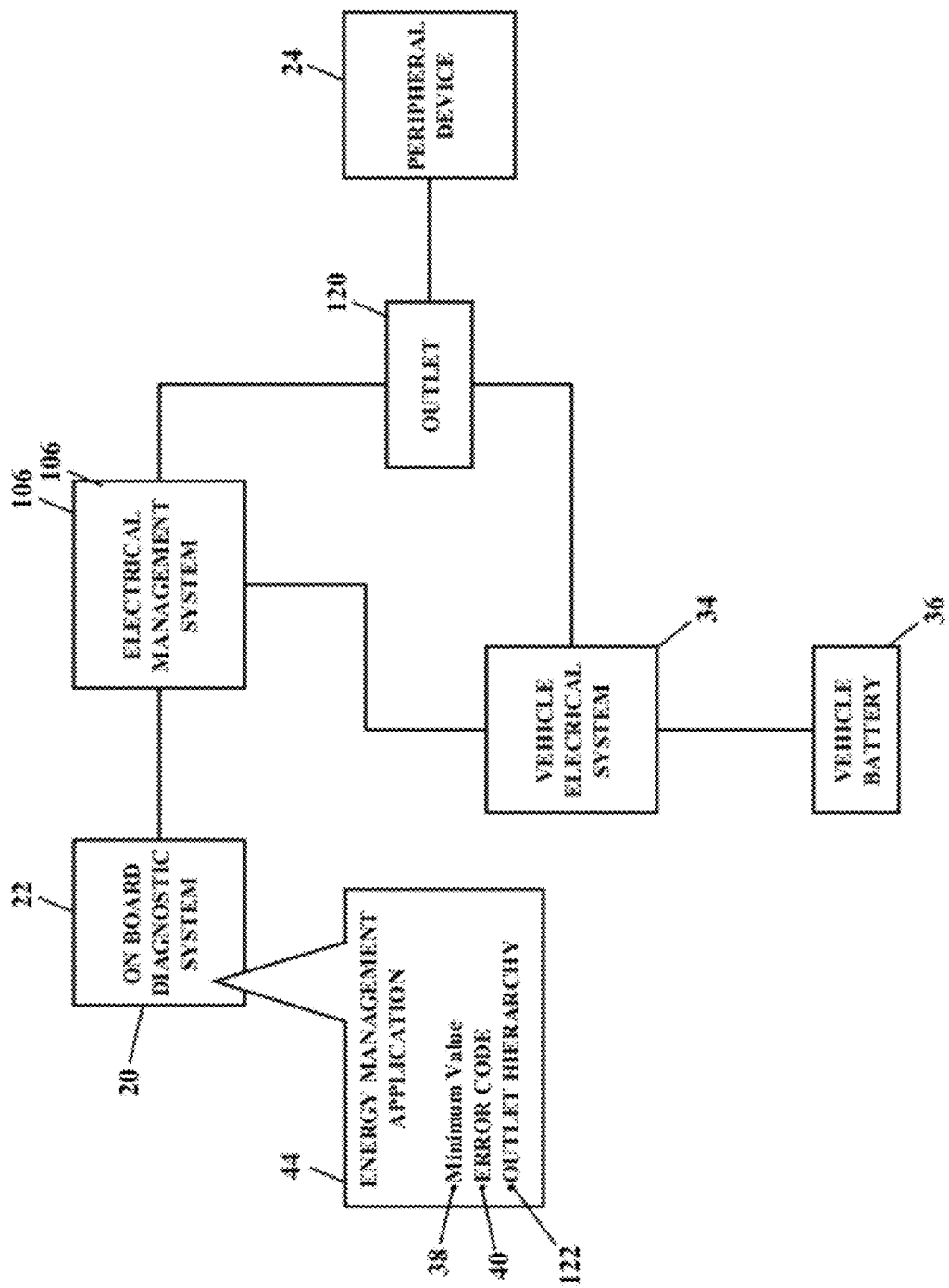
FIGS. 7 and 8 are schematics illustrating a vehicle's electrical system, according to exemplary embodiments.

FIG. 7 is a schematic further illustrating the vehicle's electrical system 34, according to exemplary embodiments. Here the vehicle's electrical system 34 may include one or more accessory outlets 120. Each accessory outlet 120 interfaces with at least one of the peripheral devices 24 and with the vehicle's electrical system 34 to receive electrical power from the vehicle battery 36. Each accessory outlet 120 may also interface with the electrical management system 106. The energy management application 44 is again illustrated as a software module or component of the vehicle's on board diagnostic system 22. Because the on board diagnostic system 22 may be processor-controlled, the on board diagnostic system 22 is also illustrated as the processor-controlled device 20. When the electrical power available from the vehicle battery 36 is less than or equal to the minimum value 38 of electrical power (e.g., $P_{Batt} \leq P_{Min}$), then the vehicle's on board diagnostic system 22 detects or flags the error code 40. The energy management application 44 receives the error code 40 and begins disabling one or more of the accessory outlets 120. The energy management application 44, for example, may send an instruction to the electrical management system 106 that instructs the electrical management system 106 to disable, disconnect, or shut down the accessory outlet 120. If there are multiple accessory outlets 120 consuming electrical power, then the electrical management system 106 may be instructed to simultaneously disconnect all the accessory outlets 120 to conserve the energy available from the vehicle battery 36. The energy management application 44, additionally or alternatively, be instructed to monitor and/or measure the electrical energy/power being consumed by each of the accessory outlets 120 and to sever or disconnect the accessory outlet 120 that is consuming the most power/energy. The energy management application 44 may continue disconnecting additional accessory outlets 120 to continue conserving the energy available from the vehicle battery 36. The energy management application 44 may even retrieve and execute an outlet hierarchy 122 that describes an order in which the accessory outlets 120 are disconnected from the vehicle battery 36.

Figure 8:
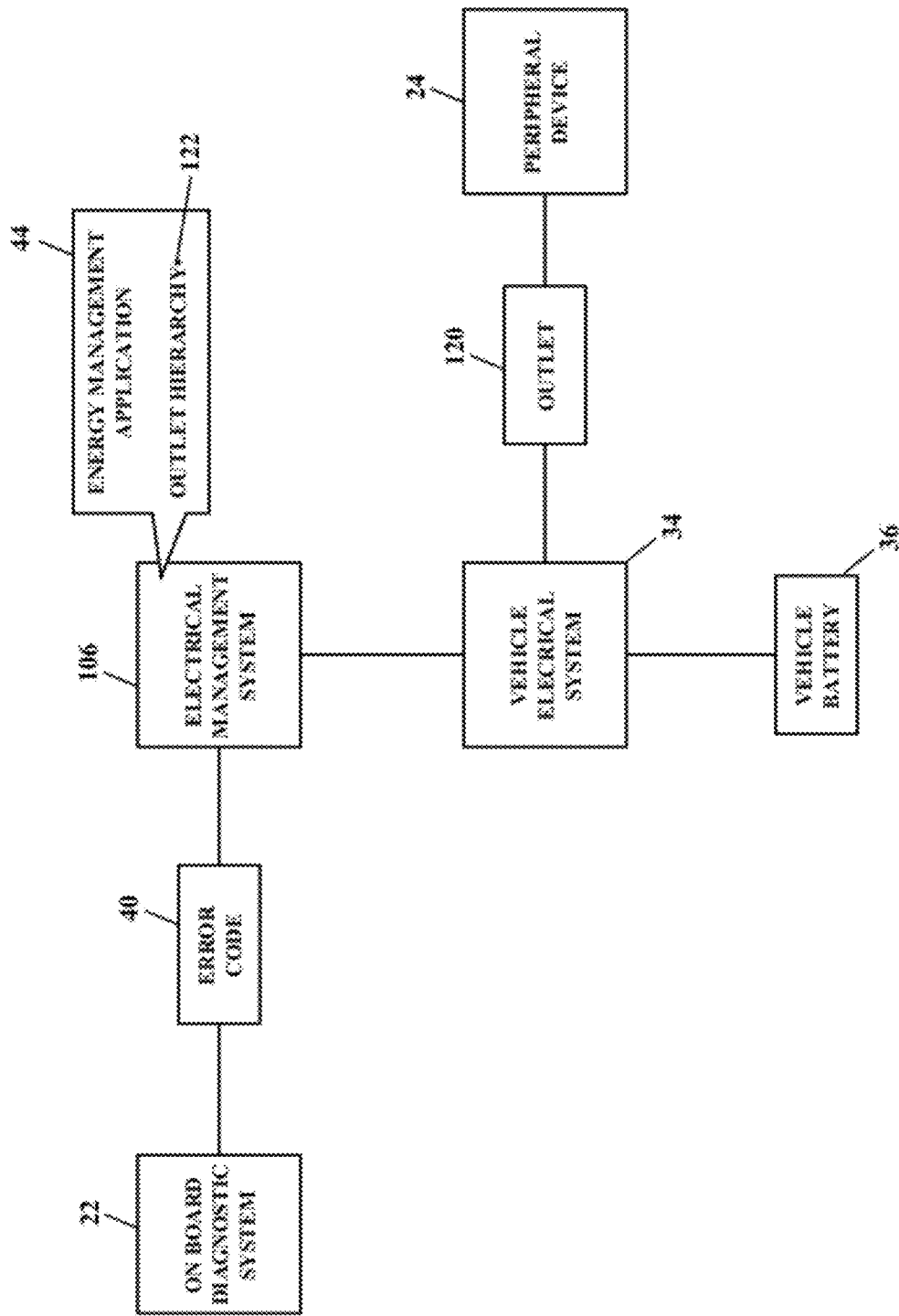

FIG. 8 is another schematic that further illustrates the vehicle's electrical system 34, according to exemplary embodiments. Here the energy management application 44 is illustrated as a software module or component of the vehicle's electrical management system 106. Because the electrical management system 106 may be processor-controlled, the electrical management system 106 is also illustrated as the processor-controlled device 20. When the electrical power available from the vehicle battery 36 is less than or equal to the minimum value 38 of electrical power (e.g., $P_{Batt} \leq P_{Min}$), then the vehicle's on board diagnostic system 22 detects or flags the error code 40. The error code 40 is communicated to the energy management application 44, and the energy management application 44 begins disabling one or more of the accessory outlets 120. The energy management application 44 may again instruct the electrical management system 106 to disable, disconnect, or shut down one, some, or all of the accessory outlets 120. The energy management application 44 may also retrieve and execute the outlet hierarchy 122 that describes an order in which the multiple accessory outlets 120 are disconnected to stop consuming electrical power or energy.

FIGS. 6-8 illustrate that the energy management application 44 may be a software or hardware component of the vehicle 100. The energy management application 44 may be a routine that is stored and executed by the electrical management system 106, the powertrain management system 108, the chassis management system 110, and/or the on board diagnostic system 22. Any controller or processor controlled device operating in the vehicle 100 may store and/or execute the energy management application 44.

Figure 9:
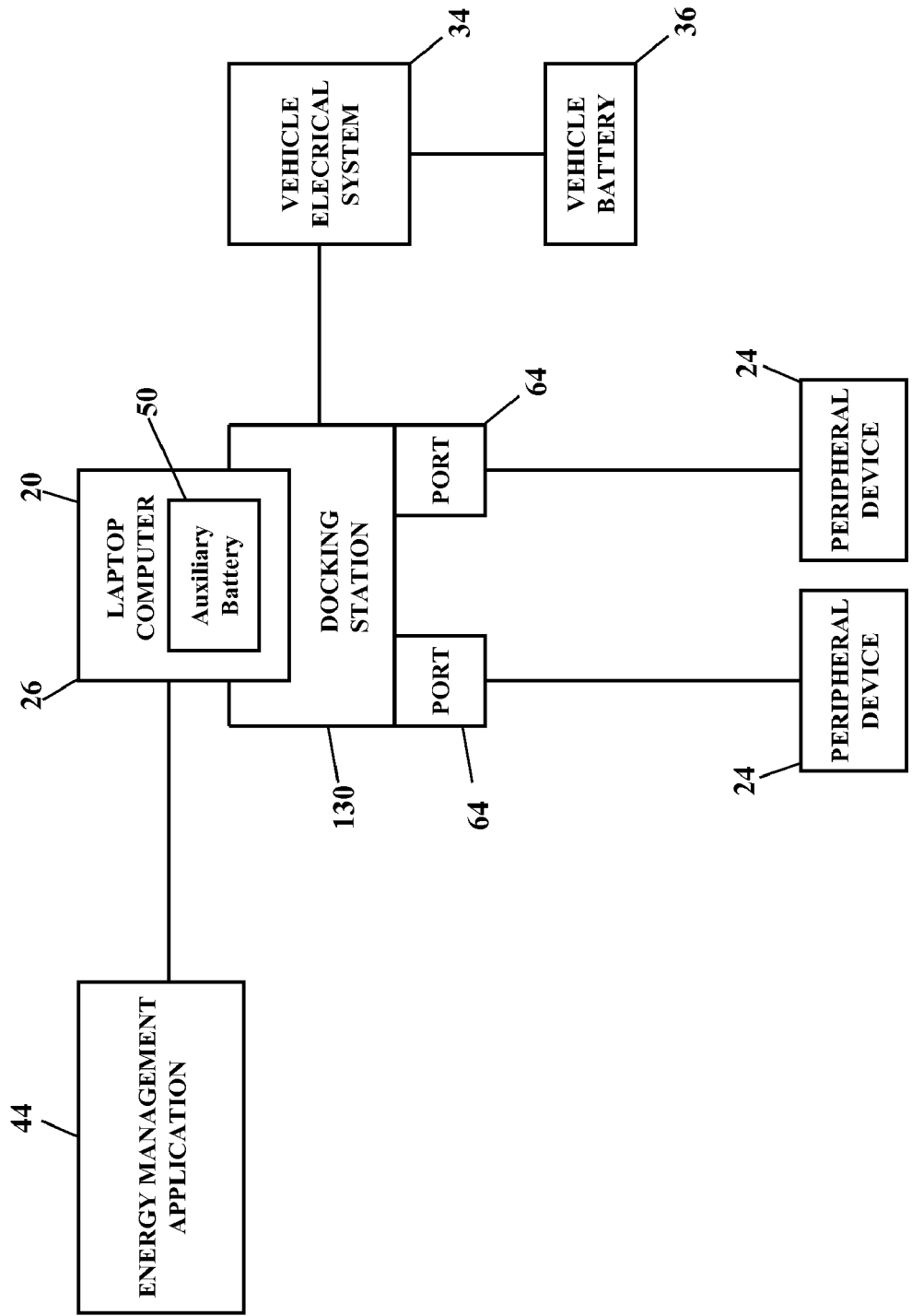
FIG. 9 is a schematic illustrating a docking station, according to exemplary embodiments.

FIG. 9 is a schematic illustrating a docking station 130, according to exemplary embodiments. The processor-controlled device 20 is illustrated as the laptop computer 26, and the laptop computer 26 may include its own auxiliary battery 50. Here, though, the laptop computer 26 and the peripheral devices 24 interface with the docking station 130. That is, the docking station 130 includes one or more of the ports 64, and each peripheral device 24 may interface with a respective one of the ports 64. The docking station 130 thus provides a single, convenient interface between the laptop computer 26 and the peripheral devices 24. The energy management application 44 interfaces with the vehicle's on board diagnostic system 22, with the auxiliary battery 50, and with the one or more peripheral devices 24. The auxiliary battery 50 may also consume electrical power from the vehicle battery 36, and the auxiliary battery 50 may also at least partially provide electrical power to the after-market peripherals 24. Here, then, the energy management application 44 may manage the energy consumed from both the vehicle battery 36 and from the auxiliary battery 50. Exemplary embodiments thus conserve the energy available from the vehicle battery 36 to ensure the minimum value 38 of electrical power remains available. The energy management application 44 again monitors the vehicle battery 36 and the auxiliary battery 50, as the above paragraphs explained. The energy management application 44 may charge the auxiliary battery 50, and disable the charging, as the above paragraphs also explained. The energy management application 44 may also selectively conserve electrical energy, as the above paragraphs explained.

Figure 10:
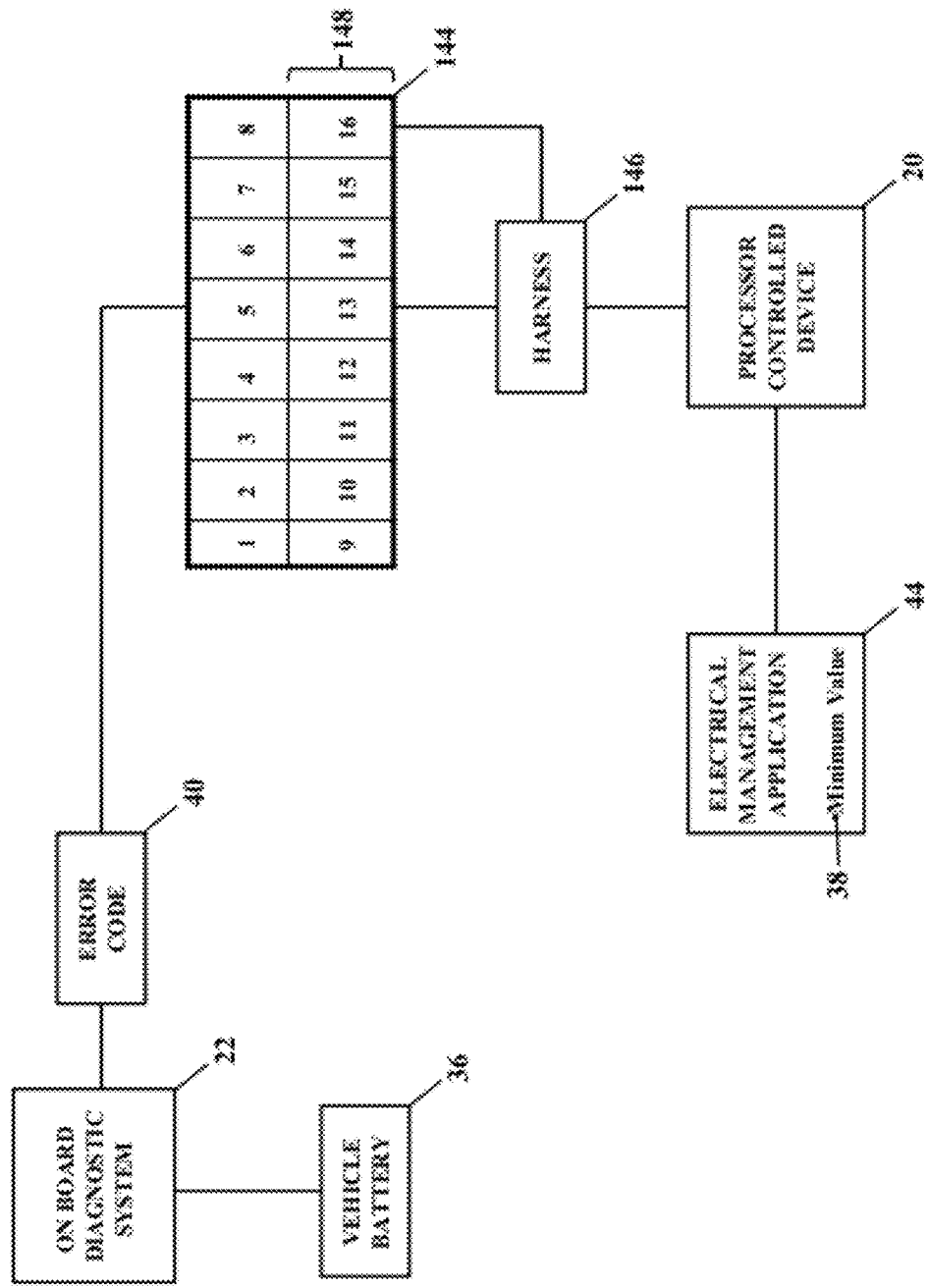
FIGS. 10 and 11 are schematics illustrating an error code, according to exemplary embodiments.
Figure 11:
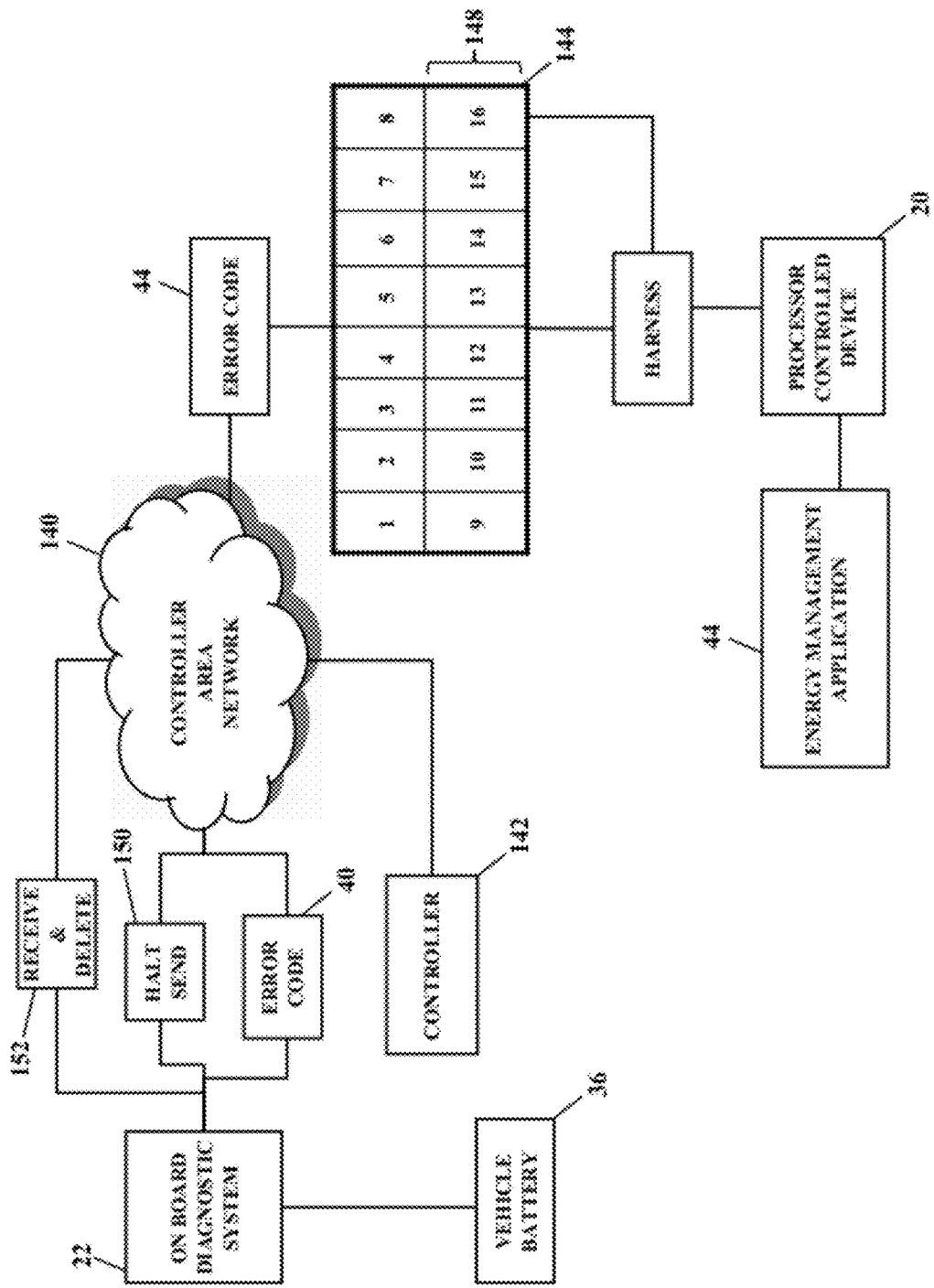

FIGS. 10 and 11 are schematics further illustrating the error code 40, according to exemplary embodiments. Here a diagnostic connector 144 allows the processor-controlled device 20 (such as the laptop computer 26 illustrated in FIG. 1) to physically connect to the on board diagnostic system 22. The diagnostic connector 144 is a standardized 16-pin female interface. A connector harness 146 mates the diagnostic connector 144 to the processor controlled device 20. Any of the pins (such as pin #16, illustrated as reference numeral 148) provides a voltage of the vehicle battery 36. The energy management application 44 thus instructs the processor-controlled device 20 to obtain a voltage reading that corresponds to the voltage of the vehicle battery 36. Exemplary embodiments also assign an unspecified or vacant pin in the diagnostic connector 144 for the error code 40. That is, when the on board diagnostic system 22 sets, detects or flags the error code 40, the on board diagnostic system 22 may reserve one of the unassigned output pins in the diagnostic connector 144 for transmitting or communicating the error code 40 to the processor controlled device 20. The on board diagnostic system 22 may directly output the error code 40 to any one of the unspecified or vacant pins to ensure the error code 40 is received without delay. The error code 40, in other words, may not be sent along the controller area network 140 but, instead, sent along a direct connection to any one of the unspecified or vacant pins. Because the error code 40 describes the minimum value 38 of electrical power available from the vehicle battery 36, exemplary embodiments may need to immediately disable and/or shut down all electrical loads to conserve the battery's available energy.

As FIG. 11 illustrates, though, the error code 40 may be sent along a controller area network 140. Here the on board diagnostic system 22 interfaces with the controller area network 140. Each vehicular component communicating with the controller area network 140 may send/receive receive messages to/from a controller 142. The diagnostic connector 144 allows the processor-controlled device 20 to physically connect to the controller area network 140 and to the on board diagnostic system 22. The on board diagnostic system 22 may prioritize the error code 40 to ensure priority delivery. The on board diagnostic system 22 may thus initiate schemes to ensure the error code 40 has delivery dominance over any other messages on the controller area network 140. The on board diagnostic system 22, for example, may prioritize the error code 40 by designing a "HI" or "LOW" bit or pin. The on board diagnostic system 22 may additionally or alternatively send a HALT SEND message 150 to one, some, or every node or component communicating with the controller area network 140. The HALT SEND message 150 causes any node to immediately cease or abandon any message that is being sent into or along the controller area network 140. The on board diagnostic system 22 may additionally or alternatively initiate or send a RECEIVE AND DELETE message 152 to a particular component or node in the controller area network 140. The RECEIVE AND DELETE message 152 instructs the particular component to accept, receive, and buffer every message in the controller area network 140. That is, the particular component accepts all messages and stores each of those messages in memory. The on board diagnostic system 22 then sends the error code 40 into the controller area network 140. Because the controller area network 140 is uncongested, the error code 40 communicates collision-free to the energy management application 44. The energy management application 44 may then implement conservation procedures, as discussed above. The particular component then resends the stored messages back into the controller area network 140.

Figure 12:
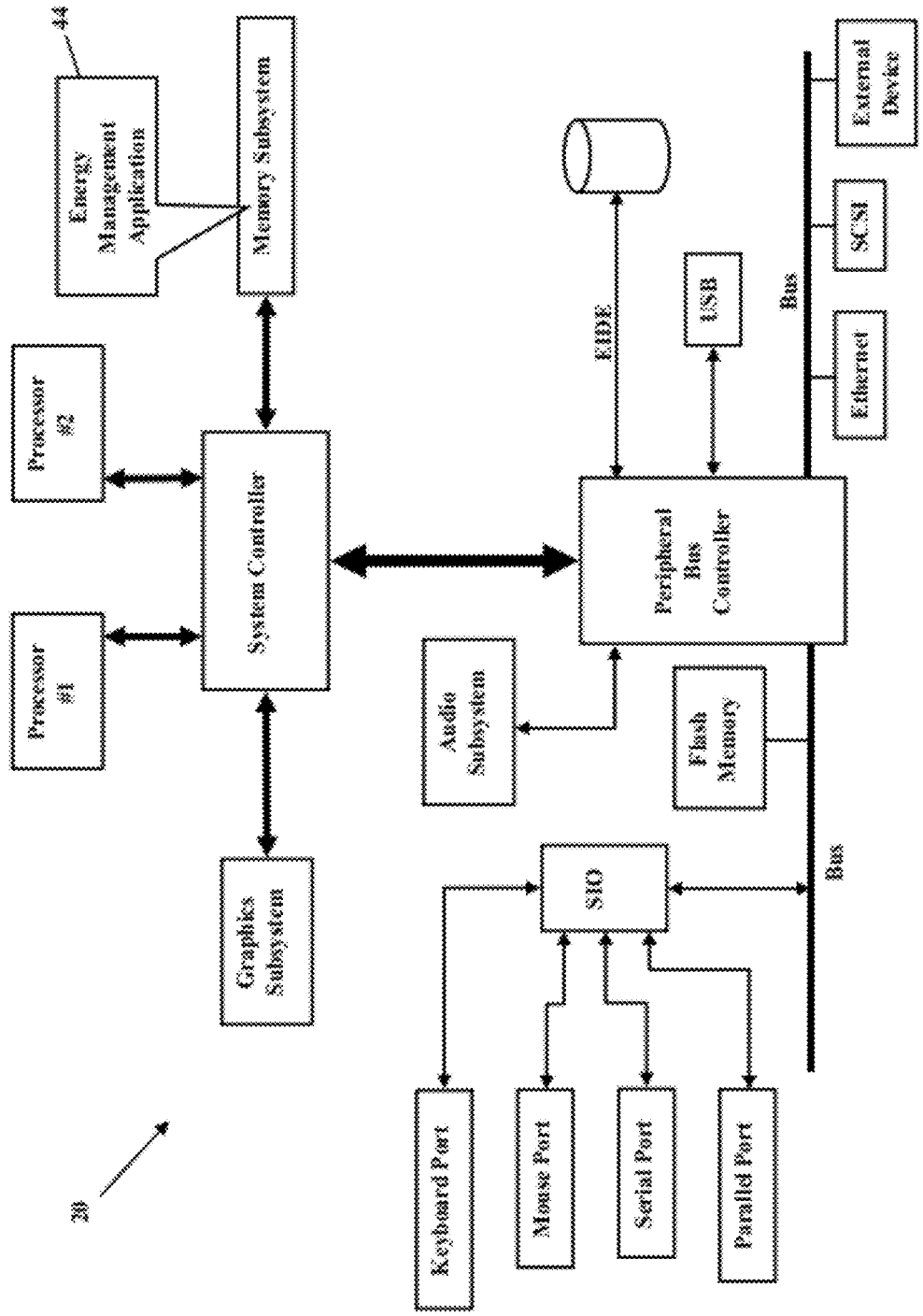
FIGS. 12 and 13 are schematics illustrating other possible operating environments for additional aspects of the exemplary embodiments.

FIG. 12 is a block diagram of the processor-controlled device 20, according to exemplary embodiments. FIG. 12 is a generic block diagram illustrating the energy management application 44 operating within the processor-controlled device 20. The energy management application 44 may be stored in a memory subsystem of the processor-controlled device 20. One or more processors communicate with the memory subsystem and execute the energy management application 44. Because the processor-controlled device 20 illustrated in FIG. 12 is well-known to those of ordinary skill in the art, no detailed explanation is needed.

Figure 13:
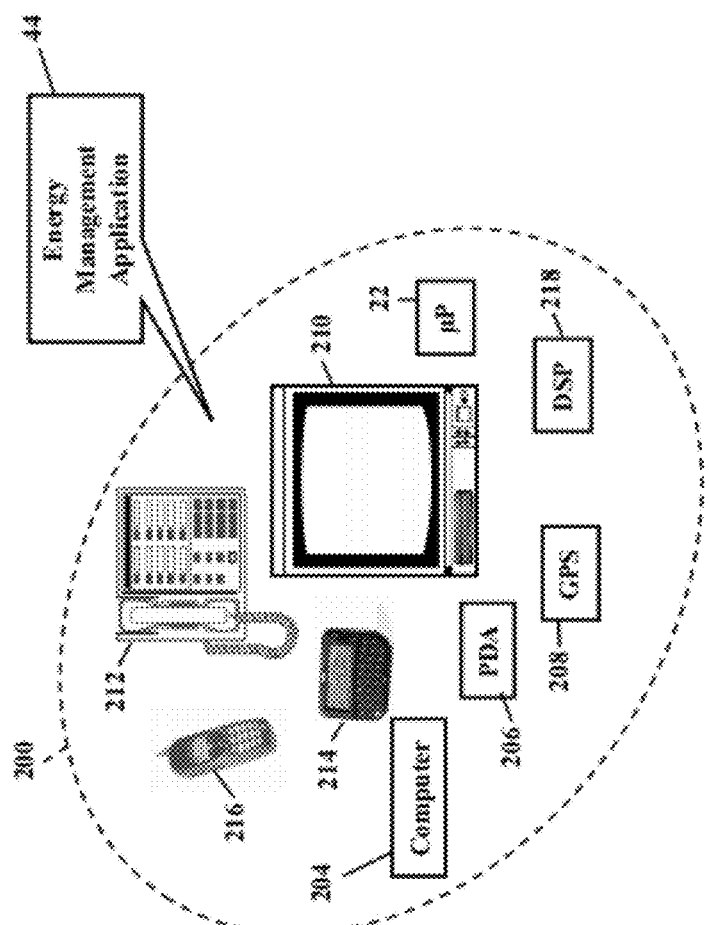

FIG. 13 depicts other possible operating environments for additional aspects of the exemplary embodiments. FIG. 13 illustrates that the energy management application 44 may alternatively or additionally operate within other processor-controlled devices 200. FIG. 13, for example, illustrates that the energy management application 44 may entirely or partially operate within a computer 204, personal digital assistant (PDA) 206, a Global Positioning System (GPS) device 208, television 210, an Internet Protocol (IP) phone 212, a pager 214, a cellular/satellite phone 216, or any system and/or communications device utilizing a digital processor and/or a digital signal processor (DP/DSP) 218. The device 200 may also include watches, radios, vehicle electronics, clocks, printers, gateways, mobile/implantable medical devices, and other apparatuses and systems. Because the architecture and operating principles of the various devices 200 are well known, the hardware and software componentry of the various devices 200 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as Specification of the *Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

Figure 14:
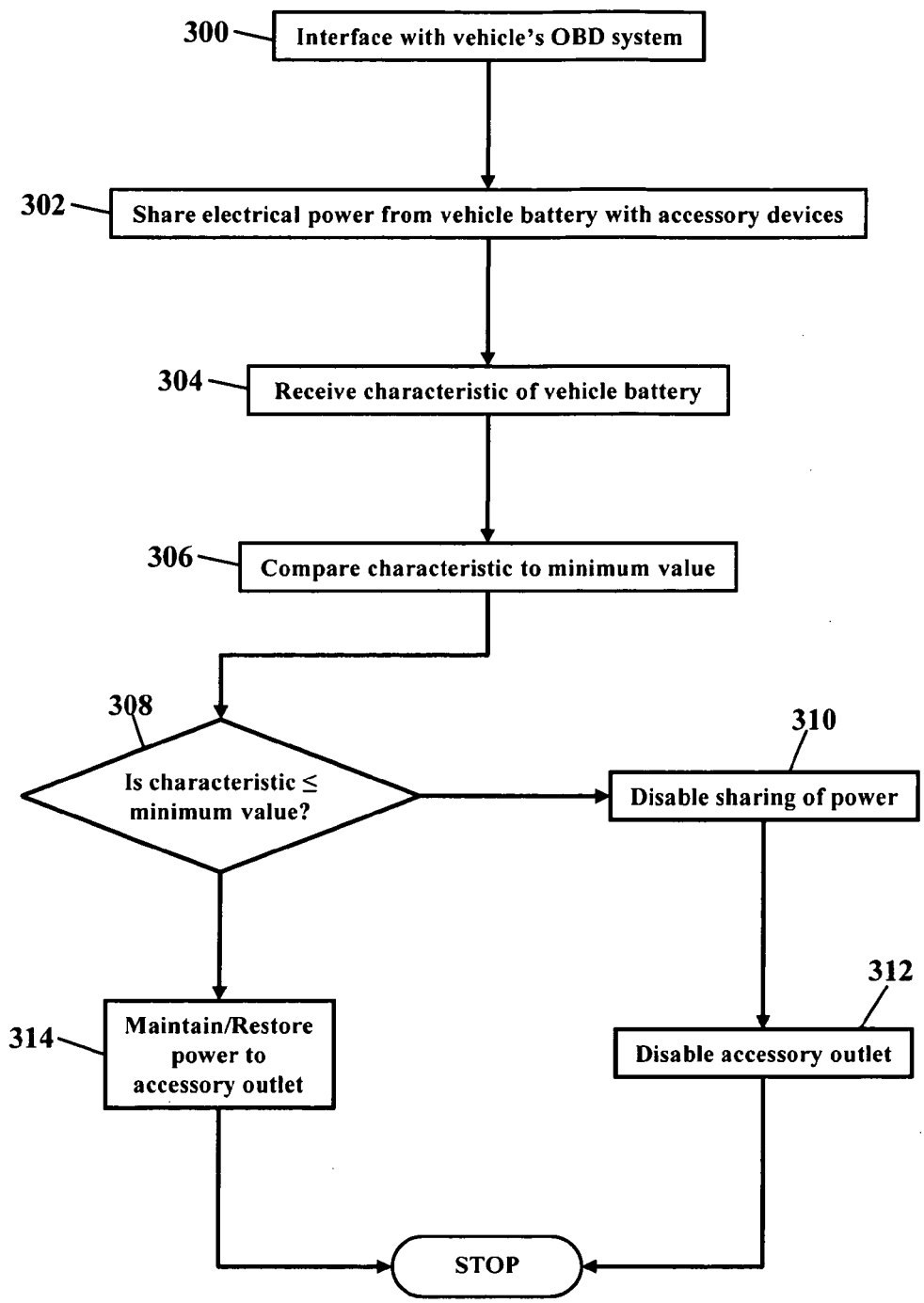
FIGS. 14-17 are flowcharts illustrating methods of managing energy consumption, according to exemplary embodiments.

FIG. 14 is a flowchart illustrating a method of managing energy consumption, according to exemplary embodiments. An interface is established with a vehicle's on-board diagnostic system ("OBD") (Block 300). Electrical power from a vehicle battery is shared amongst accessory devices (Block 302). A characteristic of the vehicle battery is received (Block 304). The characteristic of the vehicle battery is compared to a minimum value (Block 306). When the characteristic of the vehicle battery is equal to or less than the minimum value (Block 308), then the sharing of the electrical power from the auxiliary battery system may also be disabled (Block 310). An accessory outlet may be disabled that provides electrical power to a peripheral device (Block 312). When the characteristic of the vehicle battery is greater than the minimum value (Block 308), then electrical power to the accessory outlet may be maintained or restored (Block 314).

Figure 15:
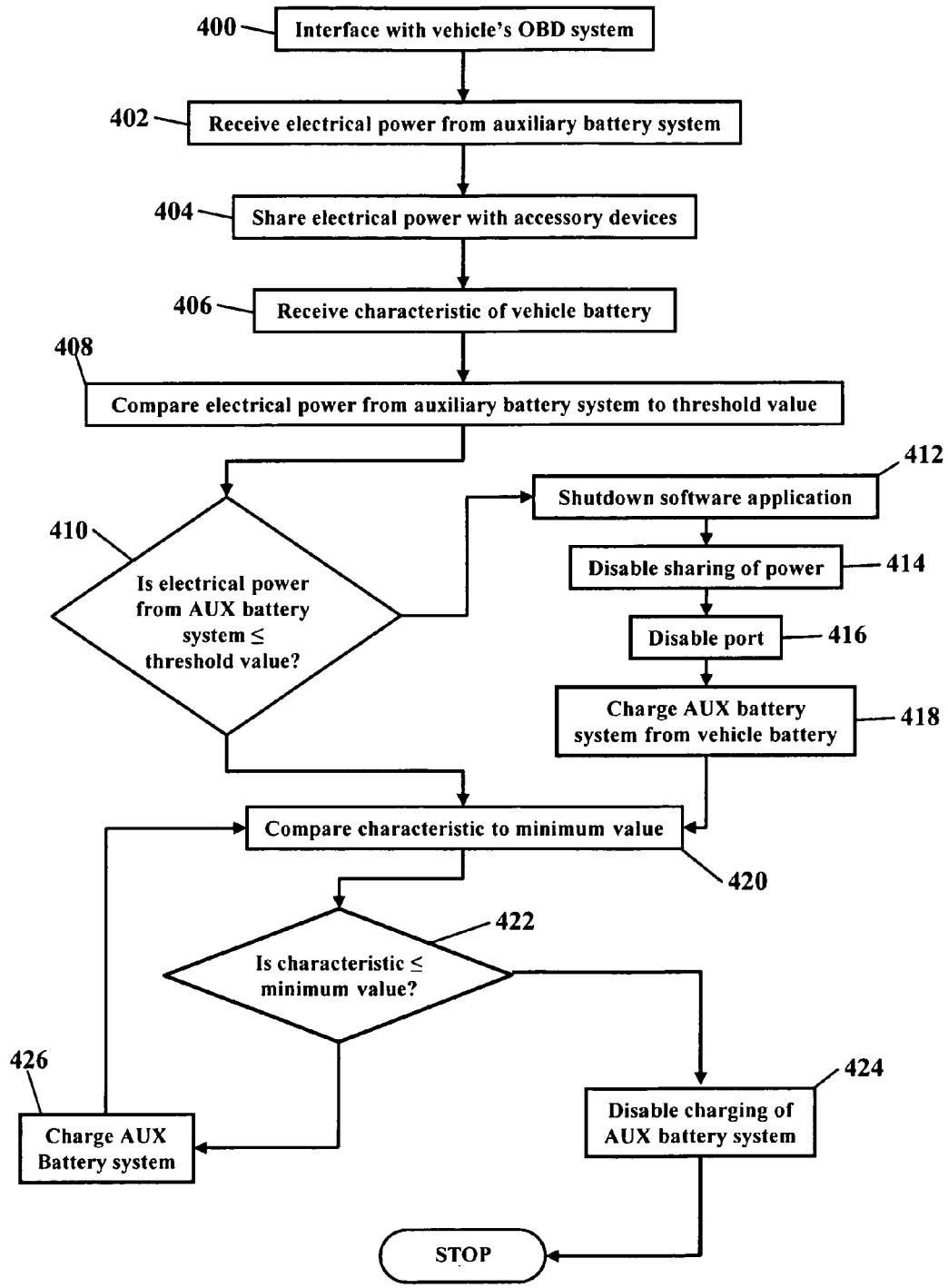

FIG. 15 is a flowchart illustrating a method of managing energy consumption, according to exemplary embodiments. An interface is established with a vehicle's on-board diagnostic system ("OBD") (Block 400). Electrical power is received from an auxiliary battery system (Block 402). The electrical power may be shared with peripheral devices (Block 404). A characteristic of a vehicle battery is received from the on board diagnostic system (Block 406). The electrical power received from the auxiliary battery system is compared to a threshold value (Block 408). When the electrical power received from the auxiliary battery system is less than the threshold value (Block 410), then a software application may be shut down to conserve the electrical power received from the auxiliary battery system (Block 412). The sharing of the electrical power from the auxiliary battery system by a peripheral device may also be disabled (Block 414). A port may also be disabled to conserve the electrical power from the auxiliary battery system (Block 416). The auxiliary battery system may also be charged with power received from the vehicle battery (Block 418). The characteristic of the vehicle battery is compared to a minimum value (Block 420). When the characteristic of the vehicle battery is equal to or less than the minimum value (Block 422), then the charging of the auxiliary battery system is disabled (Block 424). When the characteristic of the vehicle battery is greater than the minimum value (Block 422), then the charging of the auxiliary battery system continues (Blocks 426 and 420).

Figure 16:
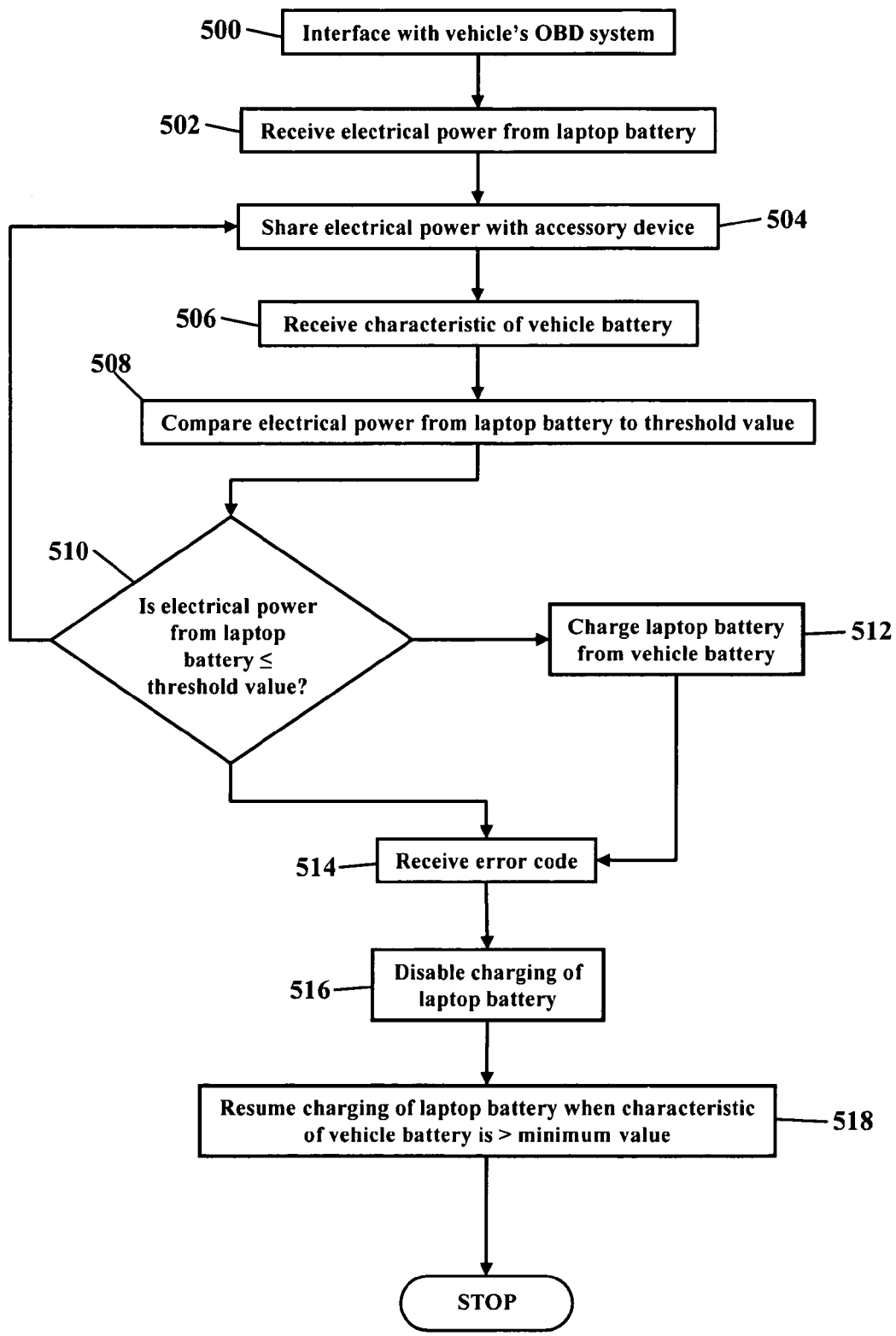

FIG. 16 is another flowchart illustrating another method of managing energy consumption, according to exemplary embodiments. An interface is established with a vehicle's on-board diagnostic system (Block 500). Electrical power is received from a battery in a laptop computer (Block 502). The electrical power from the battery in the laptop computer may be shared with the peripheral device (Block 504). A characteristic of a vehicle battery is received from the on board diagnostic system (Block 506). The electrical power received from the battery in the laptop computer is compared to a threshold value (Block 508). When the electrical power received from the battery in the laptop computer is less than the threshold value (Block 510), then the battery in the laptop computer is charged from a connection to the vehicle battery (Block 512). The characteristic of the vehicle battery is compared to a minimum value (Block 514). When the characteristic of the vehicle battery is equal to or less than the minimum value, then the charging of the battery in the laptop computer is disabled (Block 516). When the characteristic of the vehicle battery is greater than the minimum value, then the charging of the battery in the laptop computer continues (Block 518).

Figure 17:
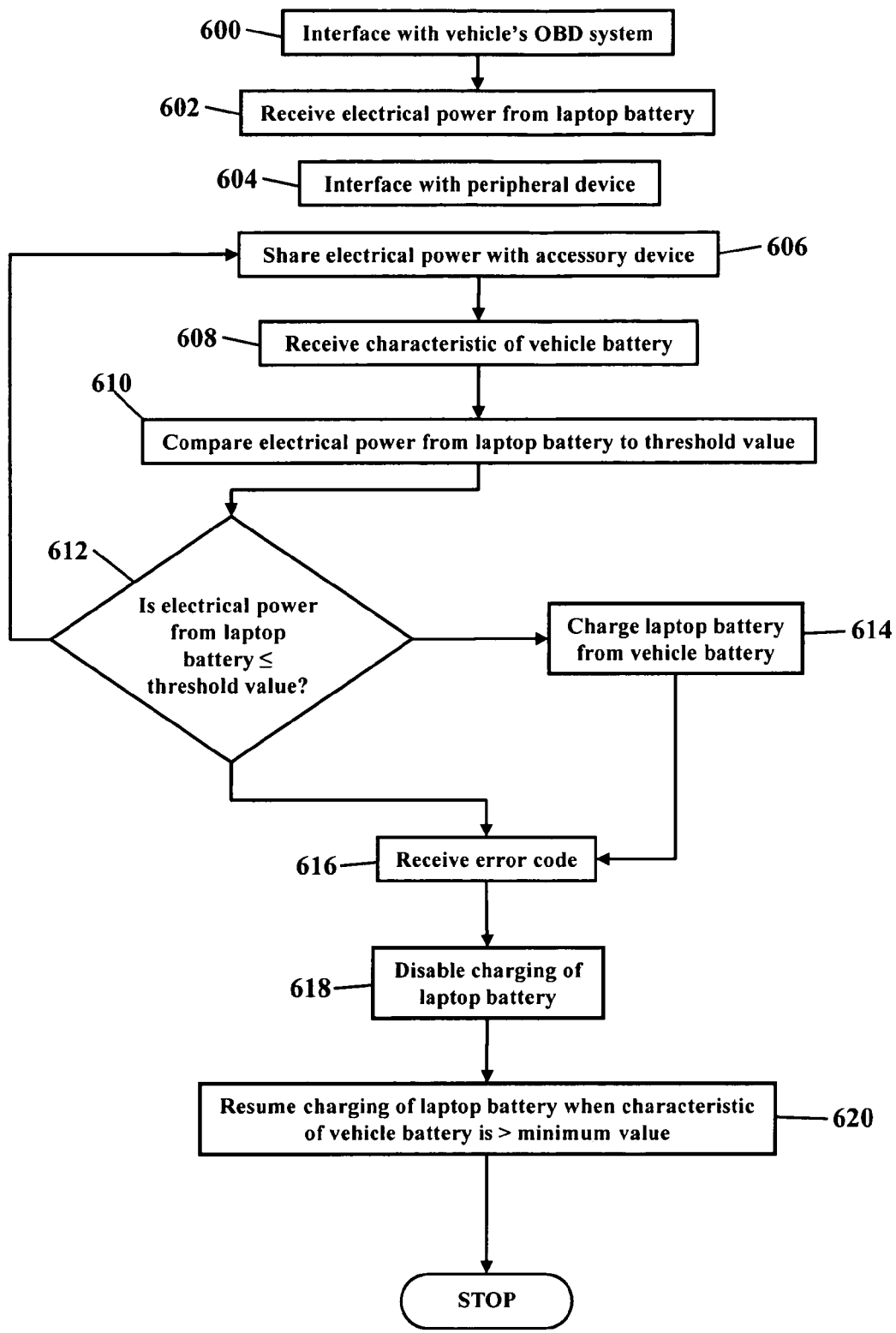

FIG. 17 is another flowchart illustrating another method of managing energy consumption, according to exemplary embodiments. An interface is established with a vehicle's on-board diagnostic system (Block 600). Electrical power is received from a battery in a laptop computer (Block 602). An interface is also established between a peripheral device and the laptop computer (Block 604). The electrical power from the battery in the laptop computer may be shared with the peripheral device (Block 606). A characteristic of a vehicle battery is received from the on board diagnostic system (Block 608). The electrical power received from the battery in the laptop computer is compared to a threshold value (Block 610). When the electrical power received from the battery in the laptop computer is less than the threshold value (Block 612), then the battery in the laptop computer is charged from a connection to the vehicle battery (Block 614). An error code is received from the on board diagnostic system that indicates the characteristic of the vehicle battery is equal to or less than a minimum value (Block 616). Charging of the battery in the laptop computer is disabled (Block 618). When the characteristic of the vehicle battery is greater than the minimum value, then the charging of the battery in the laptop computer continues (Block 620).

Exemplary embodiments may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments, permit mass dissemination of the exemplary embodiments. A computer program product comprises the computer readable medium with processor-executable instructions stored thereon.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of managing energy consumption, comprising:
   interfacing with a vehicle's on-board diagnostic system;
   receiving electrical power from an auxiliary battery system;
   receiving a characteristic of a vehicle battery from the on board diagnostic system;
   retrieving a driver-configurable minimum power level of the vehicle battery at which a driver establishes when conservation begins;
   comparing the electrical power received from the auxiliary battery system to a threshold value;
   charging the auxiliary battery system with power received from the vehicle battery when the electrical power received from the auxiliary battery system is less than the threshold value;
   comparing the characteristic of the vehicle battery to the driver-configurable minimum power level; and
   disabling the charging of the auxiliary battery system when the characteristic of the vehicle battery is less than the driver-configurable minimum power level.

2. The method according to claim 1, further comprising disabling a sharing of the electrical power from the auxiliary battery system.

3. The method according to claim 1, further comprising disabling a peripheral device that shares the electrical power from the auxiliary battery system.

4. The method according to claim 1, further comprising disabling a peripheral device that shares the electrical power from the auxiliary battery system according to a hierarchy.

5. The method according to claim 1, further comprising shutting down a software application to conserve the electrical power from the auxiliary battery system.

6. The method according to claim 1, further comprising disabling a port to conserve the electrical power from the auxiliary battery system.

7. A system for managing energy consumption, comprising:
   a processor executing code stored in memory that causes the processor to:
   interface with a vehicle's on-board diagnostic system;
   receive electrical power from a battery in a laptop computer;
   interface a peripheral device with the laptop computer;
   share the electrical power received from the battery in the laptop computer with the peripheral device;
   receive a characteristic of a vehicle battery from the on board diagnostic system;
   retrieve a driver-configurable minimum power level of the vehicle battery at which a driver establishes when conservation begins;
   compare the electrical power from the battery in the laptop computer to a threshold value;
   charge the battery in the laptop computer from a connection to the vehicle battery when the electrical power received from the battery in the laptop computer is less than the threshold value;
   compare the characteristic of the vehicle battery to the driver-configurable minimum power level; and
   disable the charging of the battery in the laptop computer when the characteristic of the vehicle battery is less than the driver-configurable minimum power level.

8. The system according to claim 7, wherein the code further causes the processor to disable the sharing of the electrical power from the battery in the laptop computer.

9. The system according to claim 7, wherein the code further causes the processor to disable a peripheral device that shares the electrical power from the battery in the laptop computer.

10. The system according to claim 7, wherein the code further causes the processor to disable a peripheral device that shares the electrical power from the battery in the laptop computer according to a hierarchy.

11. The system according to claim 7, wherein the code further causes the processor to shut down a software application running on a peripheral device to conserve the electrical power from the battery in the laptop computer.

12. The system according to claim 7, wherein the code further causes the processor to disabling a port connected to a peripheral device to conserve the electrical power from the battery in the laptop computer.

13. The system according to claim 7, wherein the code further causes the processor to retrieve a user-defined hierarchy that specifies an order in which peripheral devices connected to the laptop computer are shut down to reduce consumption of electrical power.

14. The system according to claim 7, wherein the code further causes the processor to disable a peripheral device that shares the electrical power from the battery in the laptop computer according to the user-defined hierarchy.

15. The system according to claim 7, wherein the code further causes the processor to retrieve a user-defined hierarchy that specifies an order in which the peripheral devices connected to the laptop computer are powered on to receive electrical power from the battery in the laptop computer.

16. A computer readable medium storing processor executable instructions for performing a method, the method comprising:
   interfacing with a vehicle's on-board diagnostic system;
   receiving electrical power from a battery in a laptop computer;
   sharing the electrical power received from the battery in the laptop computer with peripheral devices that interface with the laptop;
   receiving a characteristic of a vehicle battery from the on board diagnostic system;
   retrieving a driver-configurable minimum power level of the vehicle battery at which a driver establishes when conservation begins;
   comparing the electrical power received from the battery in the laptop computer to a threshold value;
   charging the battery in the laptop computer from a connection to the vehicle battery when the electrical power received from the battery in the laptop computer is less than the threshold value;
   receiving an error code from the on board diagnostic system that indicates the characteristic of the vehicle battery is equal to or less than the driver-configurable minimum power level; and
   disabling the charging of the battery in the laptop computer when the characteristic of the vehicle battery is less than the driver-configurable minimum power level.

17. The computer readable medium according to claim 16, further comprising instructions for disabling the sharing of the electrical power from the battery in the laptop computer.

18. The computer readable medium according to claim 16, further comprising instructions for disabling a peripheral device that shares the electrical power from the battery in the laptop computer.

19. The computer readable medium according to claim 16, further comprising instructions for retrieving a user-defined hierarchy that specifies an order in which the peripheral devices connected to the laptop computer are shut down to reduce consumption of electrical power.

20. The computer readable medium according to claim 16, further comprising instructions for retrieving a user-defined hierarchy that specifies an order in which the peripheral devices connected to the laptop computer are powered on to receive electrical power from the battery in the laptop computer.

* * * * *